(12) United States Patent
Chang et al.

(10) Patent No.: US 12,497,103 B2
(45) Date of Patent: Dec. 16, 2025

(54) INDEPENDENT CORNER MODULE

(71) Applicants: Hyundai Motor Company, Seoul (KR); Kia Corporation, Seoul (KR)

(72) Inventors: Sehyun Chang, Suwon-si (KR); Sang Woo Hwang, Seoul (KR); Min Jun Kim, Busan (KR); Young Il Sohn, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 612 days.

(21) Appl. No.: 17/955,744

(22) Filed: Sep. 29, 2022

(65) Prior Publication Data

US 2023/0115506 A1 Apr. 13, 2023

(30) Foreign Application Priority Data

Oct. 13, 2021 (KR) .......................... 10-2021-0135564

(51) Int. Cl.
*B62D 7/18* (2006.01)
*B62D 7/14* (2006.01)

(52) U.S. Cl.
CPC .............. *B62D 7/18* (2013.01); *B62D 7/146* (2013.01)

(58) Field of Classification Search
CPC . B62D 7/18; B62D 7/146; B62D 7/06; B62D 5/0418; B60G 2200/44; B60G 2206/50; B60G 3/20; B60G 2200/144; B60G 2800/24; B60G 2200/46
See application file for complete search history.

(56) References Cited

U.S. PATENT DOCUMENTS

| | | | | |
|---|---|---|---|---|
| 6,336,514 B1 * | 1/2002 | Ramacher | ................ | B62D 7/02 180/443 |
| 2005/0280236 A1 * | 12/2005 | Vallejos | ................... | B60G 3/01 280/124.11 |
| 2013/0333966 A1 * | 12/2013 | Bryant | .................. | B60K 17/30 180/65.51 |
| 2023/0051754 A1 * | 2/2023 | Chang | .................... | B62D 5/001 |
| 2023/0129358 A1 * | 4/2023 | Chang | ................. | B62D 5/0418 74/422 |

FOREIGN PATENT DOCUMENTS

| | | | | | |
|---|---|---|---|---|---|
| CN | 101143600 A | * | 3/2008 | ............. | B60G 3/22 |
| CN | 107031323 A | * | 8/2017 | ............. | B60G 3/01 |
| CN | 114929564 B | * | 8/2024 | ............. | B60G 3/01 |
| DE | 19645343 A1 | * | 5/1998 | ........... | B60G 13/008 |
| DE | 102014225599 A1 | * | 6/2016 | ............. | B60G 3/06 |

(Continued)

*Primary Examiner* — Drew J Brown
(74) *Attorney, Agent, or Firm* — Slater Matsil, LLP

(57) ABSTRACT

An embodiment independent corner module includes a knuckle fastened to a wheel, a steering frame fastened to the knuckle, the steering frame having an upper end configured to be fixed to a vehicle body and to rotate together with the knuckle to apply a steering angle to the wheel, a steering drive unit fastened to the steering frame, and a body guide rail fastened to the steering drive unit and configured to be disposed on the vehicle body, wherein, in response to reception of a driving force of the steering drive unit, the steering drive unit is configured to be rotated along the body guide rail and the steering frame is configured to be rotated simultaneously along with the rotation of the steering drive unit.

20 Claims, 6 Drawing Sheets

(56) References Cited

FOREIGN PATENT DOCUMENTS

| | | | | |
|---|---|---|---|---|
| DE | 102023134396 A1 | * | 9/2024 | |
| JP | 04287707 A | * | 10/1992 | |
| JP | H0558127 A | * | 3/1993 | |
| KR | 20070103191 A | | 10/2007 | |
| WO | WO-2024053374 A1 | * | 3/2024 | ............ B62D 17/00 |

* cited by examiner

INDEPENDENT CORNER MODULE

CROSS-REFERENCE TO RELATED APPLICATIONS

This application claims the benefit of Korean Patent Application No. 10-2021-0135564, filed on Oct. 13, 2021, which application is hereby incorporated herein by reference.

TECHNICAL FIELD

The present disclosure relates to an independent corner module.

BACKGROUND

A conventional vehicle suspension system connects an axle to a vehicle body and serves to prevent vibration or shock, which is received from the road surface by the axle, from being directly transmitted to the vehicle body while the vehicle is traveling, thereby preventing damage to the vehicle body or cargo and improving ride comfort. This suspension system includes a suspension spring for alleviating shock received from the road surface, a shock absorber for suppressing free vibration of the suspension spring to improve ride comfort, a stabilizer for suppressing rolling of the vehicle, and so on.

A commercial vehicle mainly uses an integral-type suspension system in which left and right wheels are interconnected by one axle, where a leaf spring or an air spring is mainly used as the suspension spring of the integral-type suspension system.

Meanwhile, the steering system of the commercial vehicle using the integral-type suspension system includes a pitman arm mounted on and rotated around an output shaft of a steering gear, a drag link for transmitting the motion of the pitman arm to knuckle arms, the knuckle arms configured to operate a knuckle spindle by receiving the motion of the drag link, a tie rod connecting the left and right knuckle arms, and so on.

As illustrated in FIG. 1, a suspension system in which the shock absorber thereof has one end fixed to a body frame is illustrated.

In the vehicle that includes the steering system and the integral-type suspension system using the air spring as described above, the air spring serves only to replace the leaf spring and does not significantly contribute to improving ride comfort and handling characteristics. In addition, the degree of freedom in design of the air spring to implement a precise geometry is limited due to the structural characteristics thereof.

In recent years, an independent steering suspension system for inputting a steering angle to a wheel through a motor assembly has been developed. However, the above independent steering suspension system has a problem in stably transmitting rotational force from a steering motor to a knuckle and a wheel.

Korea Patent Application Publication No. 2007-0103191 (Oct. 23, 2007) describes information related to the subject matter of the present application.

The above information disclosed in this background section is only for enhancement of understanding of the background of the invention and therefore it may contain information that does not form the prior art that is already known to a person of ordinary skill in the art.

SUMMARY

The present disclosure relates to an independent corner module. Particular embodiments relate to an independent corner module configured to apply a wide steering angle to a wheel by independently rotating a steering drive unit and a steering frame in response to reception of a driving force of the steering drive unit located between the steering frame and a body guide rail.

Embodiments of the present invention can solve problems associated with the prior art.

One embodiment of the present invention provides an independent corner module that allows a steering drive unit and a steering frame to rotate independently.

Another embodiment of the present invention provides an independent corner module in which, in response only to reception of a driving force of a steering drive unit, the steering drive unit is rotated and a steering frame is rotatable simultaneously along with the rotation of the steering drive unit.

Embodiments of the present invention are not limited to the above-mentioned embodiments, and other embodiments of the present invention can be understood by the following description, and will become apparent with reference to the described embodiments of the present invention. Also, the embodiments of the present invention can be realized by the means as claimed and combinations thereof.

In order to achieve the above embodiments of the present invention, there is provided an independent corner module configured as follows.

In a preferred embodiment, there is provided an independent corner module that includes a knuckle fastened to a wheel, a steering frame fastened to the knuckle, having an upper end fixed to a vehicle body, and configured to rotate together with the knuckle to apply a steering angle to the wheel, a steering drive unit fastened to the steering frame and configured to apply a driving force, and a body guide rail located on the vehicle body and fastened to the steering drive unit, wherein, in response to reception of the driving force of the steering drive unit, the steering drive unit is rotated along the body guide rail and the steering frame is rotated simultaneously along with the rotation of the steering drive unit.

The steering drive unit may include a carrier link configured to surround at least a portion of the steering frame and the body guide rail and movable along the body guide rail, a motor configured to apply a rotational force, and a steering gear extending from a rotary shaft of the motor and engaged to the body guide rail and the steering frame.

The carrier link may include an upper plate located on upper ends of the steering frame and the body guide rail, a lower plate configured to surround lower ends of the steering frame and the body guide rail at a position corresponding to the upper plate, an upper roller located between the steering frame and the upper plate and between the body guide rail and the upper plate, and a lower roller located between the steering frame and the lower plate and between the body guide rail and the lower plate.

The upper and lower rollers may face inclined parts formed at ends of the steering frame and the body guide rail.

The steering frame may include a buffer located between the knuckle and the steering frame, a bearing located at the upper end of the steering frame and fastened to the vehicle body, and a gear formed at a position facing the steering drive unit.

The buffer may have an upper end fastened to the steering frame, and a lower end fastened to the knuckle through the steering frame.

The independent corner module may further include a trailing arm located at a lower end of the steering frame to be fastened to the knuckle, the trailing arm being moved along with vertical movement of the knuckle.

The body guide rail may include a guide gear formed at a position facing the steering driving unit.

The gear of the steering frame and the guide gear of the body guide rail may have the same axis of rotation.

Other aspects and preferred embodiments of the invention are discussed infra.

It is understood that the term "vehicle" or "vehicular" or other similar term as used herein is inclusive of motor vehicles in general such as passenger automobiles including sport utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of embodiments of the invention are discussed infra.

BRIEF DESCRIPTION OF THE DRAWINGS

The above and other features of embodiments of the present invention will now be described in detail with reference to certain exemplary embodiments thereof illustrated in the accompanying drawings which are given hereinbelow by way of illustration only, and thus are not limitative of the present invention, and wherein.

Figure 1:
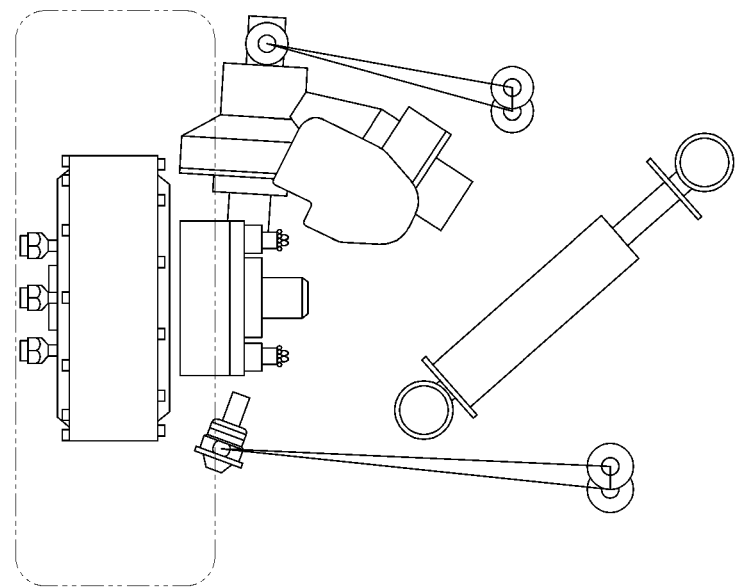
FIG. 1 illustrates a coupling relationship of a conventional revo knuckle.

It should be understood that the appended drawings are not necessarily to scale, presenting a somewhat simplified representation of various preferred features illustrative of the basic principles of the invention. The specific design features of embodiments of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawings.

DETAILED DESCRIPTION OF ILLUSTRATIVE EMBODIMENTS

Hereinafter, exemplary embodiments of the present invention will be described in more detail with reference to the accompanying drawings. The present invention may be embodied in different forms and should not be construed as being limited to the embodiments set forth herein. Rather, these embodiments are provided so that this disclosure will be thorough and complete, and will fully convey the scope of the present invention to those skilled in the art.

In addition, the term " . . . knuckle", " . . . arm", " . . . rail", " . . . frame", " . . . link", or the like used herein refers to a unit for processing at least one function or operation, which may be implemented by hardware, software, or a combination thereof.

Hereinafter, exemplary embodiments will be described in detail with reference to the accompanying drawings. Throughout the disclosure, like reference numerals refer to like parts throughout the various figures. In certain embodiments, a redundant description thereof will be omitted.

The present invention relates to an independent corner module. A multi-wheeled vehicle may include an independent corner module fastened to each wheel thereof, wherein the independent corner module may be configured to have a steering angle of 90 degrees either to the left or to the right.

The independent corner module may be fixed to a vehicle body. Accordingly, the independent corner module may be welded or bolted to the vehicle body, and may be energized with a battery in the vehicle body to receive electric power from the vehicle body. As described above, the independent corner module may be configured to be energized with the vehicle while being fixed to the vehicle body in a typical manner.

Hereinafter, the independent corner module according to an embodiment of the present invention will be described with reference to a left wheel 10 of the vehicle.

Figure 2:
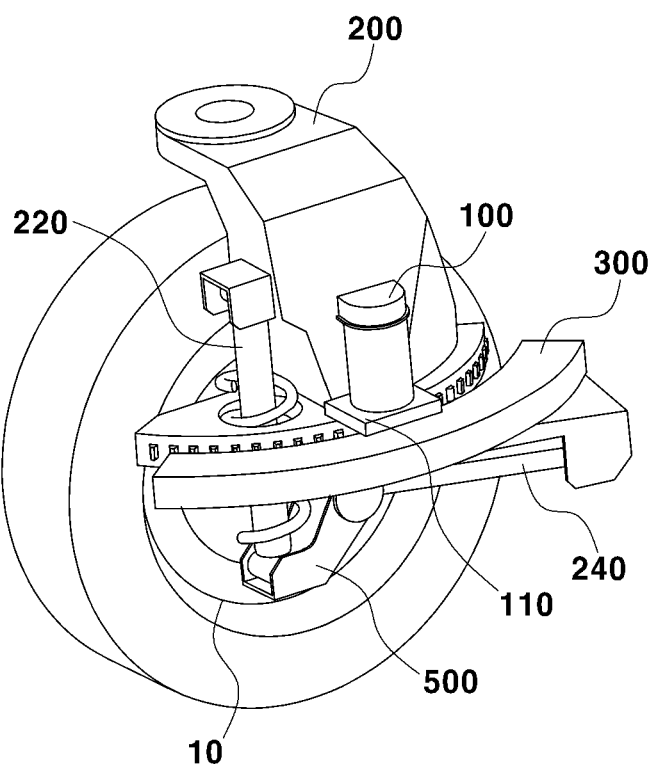
FIG. 2 is a perspective view illustrating an independent corner module according to an embodiment of the present invention.
Figure 3:
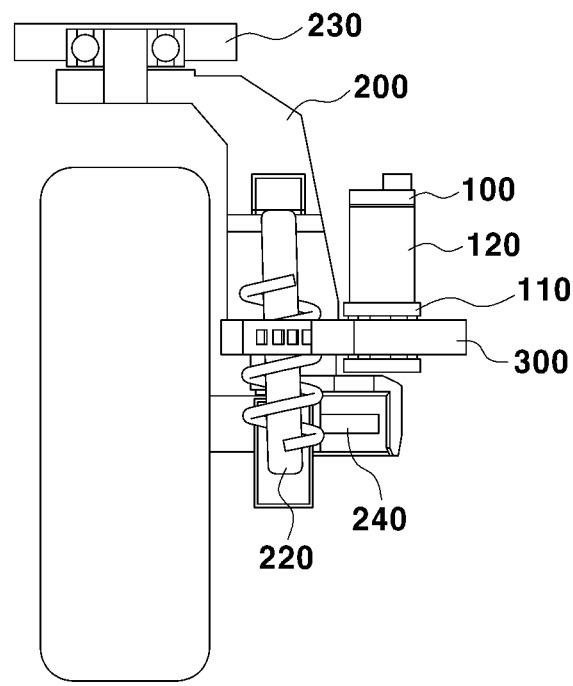
FIG. 3 is a front view illustrating the independent corner module according to an embodiment of the present invention.
Figure 4:
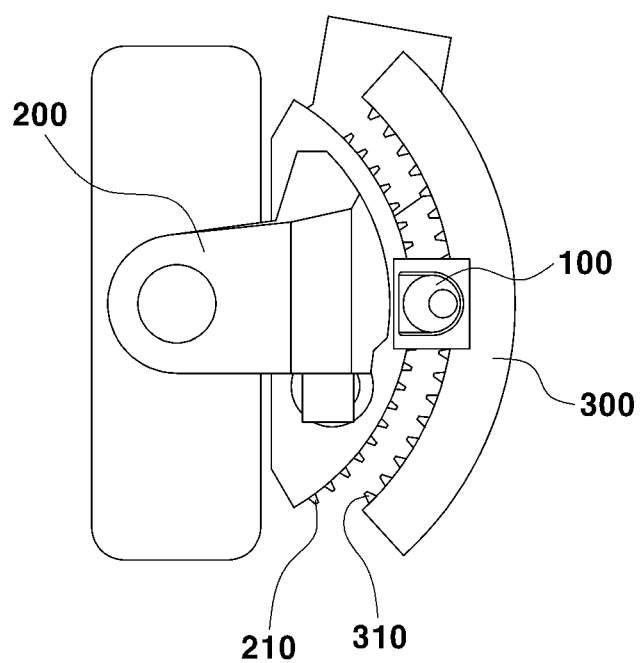
FIG. 4 is a top view illustrating the independent corner module according to an embodiment of the present invention.

FIG. 2 is a perspective view illustrating the independent corner module according to an embodiment of the present invention. FIG. 3 is a front view illustrating the independent corner module according to an embodiment of the present invention. FIG. 4 is a top view illustrating the independent corner module according to an embodiment of the present invention.

As illustrated in the drawings, the independent corner module of embodiments of the present invention includes a body guide rail 300 fastened to the vehicle body, a steering drive unit 100 located adjacent to the outer surface of the body guide rail 300, and a steering frame 200 located outside the steering drive unit 100. The steering frame 200 has an upper end fixed to the vehicle body and is configured to be rotatable in response to input of a steering angle to the wheel 10.

The independent corner module includes a knuckle 500 located adjacent to the steering frame 200, and the wheel 10 is located outside the knuckle 500. The knuckle 500 is located adjacent to the lower end of the steering frame 200. The steering frame 200 rotates about the upper end thereof, which is fastened to the vehicle, in the left and right directions together with the knuckle 500.

The steering frame 200 has one end in the form of an arc adjacent to the steering drive unit 100. Moreover, the body guide rail 300 has one end in the form of an arc corresponding to the end of the steering frame 200 while maintaining a constant distance from the end of the steering frame 200 with respect to the steering drive unit 100. More preferably, the arc-shaped end of each of the steering frame 200 and the body guide rail 300 may have a central axis positioned at the center of the wheel 10.

The steering frame 200 has a lower end fastened to the knuckle 500 through a trailing arm 240. The trailing arm 240 has, with respect to the axis of rotation thereof defined in the width direction of the vehicle, one end fastened to the knuckle 500 and the other end fastened to the steering frame 200. Accordingly, when the wheel 10 is in a bump or rebound state, one end of the knuckle 500 and the steering frame 200 are moved together with the trailing arm 240.

The wheel 10 is fastened to one end of the knuckle 500 in the width direction thereof, and the steering frame 200 is located adjacent to the inside of the knuckle 500. More preferably, the steering frame 200 is fastened to the inside of the knuckle 500 through the trailing arm 240. In addition, the independent corner module includes a buffer 220 fastened to the upper end of the knuckle 500 and fixed through the steering frame 200. More preferably, the buffer 220 may be a shock absorber, and may include a spring configured to surround the shock absorber.

The steering drive unit 100 includes a carrier link 110, a motor 120 located at the upper end of the carrier link 110, and a steering gear 130 located on the central axis of the motor 120. The steering gear 130 is engaged to a gear 210 formed on the inner end of the steering frame 200 and a guide gear 310 located on the outer surface of the body guide rail 300.

The carrier link 110 includes an upper plate 111 and a lower plate 113, and the steering gear 130 is located between the upper plate 111 and the lower plate 113. Moreover, at least a portion of the outer end of the body guide rail 300 and at least a portion of the inner end of the steering frame 200 are located between the upper plate 111 and the lower plate 113. Accordingly, when power is applied to the motor 120, the carrier link 110 of the steering drive unit 100 rotates along the arc-shaped outer end of the body guide rail 300 and the steering frame 200 rotates in the same direction along the steering gear 130.

The steering frame 200 includes an extension extending from one end thereof facing the steering drive unit 100 in the longitudinal direction of the vehicle, and the knuckle 500 is fastened to the trailing arm 240 located at the lower end of the extension. The steering frame 200 includes a bearing 230 located at the upper end thereof to be rotatably fastened to the vehicle body. Accordingly, when the driving force of the steering drive unit 100 is applied, the steering frame 200 may rotate with respect to the vehicle body.

The steering frame 200 includes the gear 210 formed at a position corresponding to the steering gear 130 of the steering drive unit 100, and the gear 210 is engaged to the steering gear 130 to receive a driving force from the motor 120 of the steering drive unit 100. Accordingly, the steering frame 200 rotates about the upper end thereof together with the knuckle 500.

Figure 5:
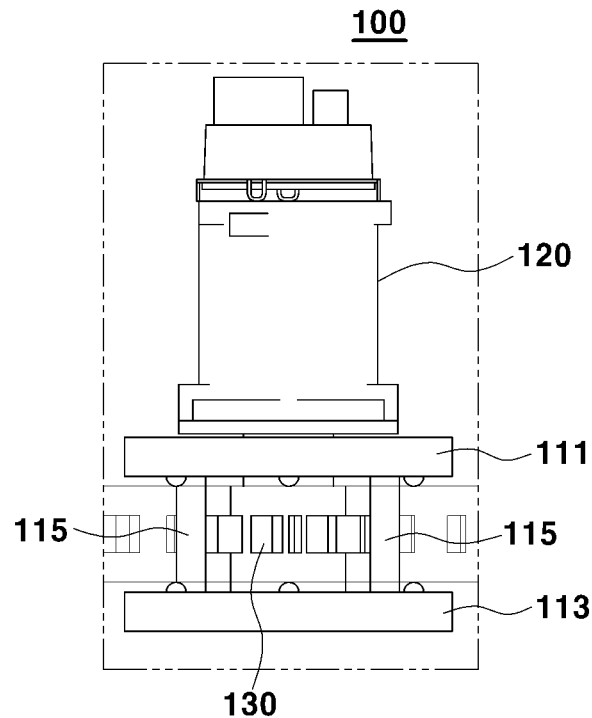
FIG. 5 illustrates a coupling relationship of a steering drive unit in the independent corner module according to an embodiment of the present invention.
Figure 6:
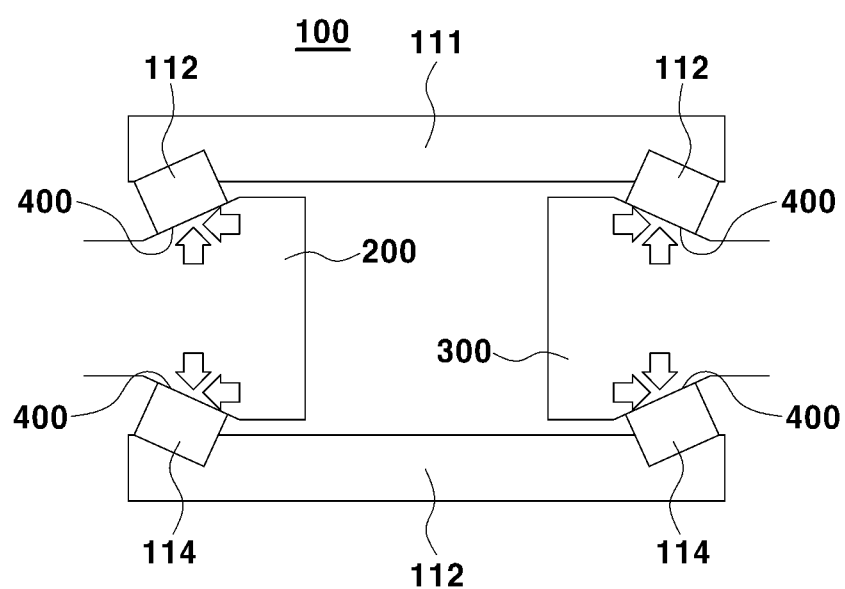
FIG. 6 illustrates a coupling relationship of a roller in the independent corner module according to an embodiment of the present invention.

FIG. 5 illustrates a coupling relationship of the steering drive unit 100 according to an embodiment of the present invention. FIG. 6 is a cross-sectional view of the structure in which the steering drive unit 100 including the carrier link 110, the steering frame 200, and the body guide rail 300 are fastened to each other.

As illustrated in the drawings, the steering drive unit 100 includes the carrier link 110 configured to surround at least a portion of the steering frame 200 and the body guide rail 300. The carrier link 110 may include the upper plate 111 and the lower plate 113, and the upper plate 111 and the lower plate 113 may be spaced apart from each other by the same distance. Moreover, the carrier link 110 includes a fixing part 115 fixed between the upper plate 111 and the lower plate 113. The fixing part 115 maintains a distance between the upper plate 111 and the lower plate 113. In the space defined by the spaced upper and lower plates 111 and 113, the steering gear 130 is engaged to the gear 210 of the steering frame 200 and the guide gear 310 of the body guide rail 300.

In addition, the carrier link 110 includes an upper roller 112 located on the upper plate 111 to face the steering frame 200 and the body guide rail 300, and a lower roller 114 located on the lower plate 113 to face the steering frame 200 and the body guide rail 300.

The steering frame 200 and the body guide rail 300 facing the upper roller 112 and the lower roller 114 includes inclined parts 400. Accordingly, the upper and lower rollers 112 and 114 are in surface contact with the inclined parts 400.

The inclined parts 400 are formed on the ends of the steering frame 200 and the body guide rail 300 fastened to the steering gear 130. Therefore, when viewed in cross section, this allows the steering frame 200 and the body guide rail 300 to increase in height as they move closer to the steering gear 130, whereas this allows the steering frame 200 and the body guide rail 300 to decrease in height as they move away from the steering gear 130. The inclined parts 400 are located inside the carrier link 110.

As illustrated in FIG. 6, the inclined parts 400 are formed on the ends of the steering frame 200 and the body guide rail 300 located inside the carrier link 110. Moreover, the ends of the steering frame 200 and the body guide rail 300 located inside the carrier link 110 are greater in height than the ends of the steering frame 200 and the body guide rail 300 located outside the carrier link 110. Accordingly, the inclined parts 400 are formed on the upper and lower surfaces of the ends of the steering frame 200 and the body guide rail 300.

The upper and lower rollers 112 and 114 are in surface contact with the inclined parts 400. The upper and lower rollers 112 and 114 facing the inclined parts 400 of the body guide rail 300 are rotated so that the steering drive unit 100 is moved. In addition, the upper and lower rollers 112 and 114 facing the inclined parts 400 formed on the ends of the steering frame 200 are rotated as the steering frame 200 moves.

That is, the upper and lower rollers 112 and 114 are maintained with low friction in response to the relative movement of the steering frame 200, the body guide rail 300, and the steering drive unit 100 located inside the carrier link 110.

The upper and lower rollers 112 and 114 facing the steering frame 200 and the body guide rail 300 including the inclined parts 400 support horizontal and vertical forces applied therethrough from the steering frame 200 and the body guide rail 300.

In addition, the upper and lower rollers 112 and 114 located on the inclined parts 400 may function as protrusions by which the steering frame 200 and the body guide rail 300 are latched inside the carrier link 110.

Figure 7A:
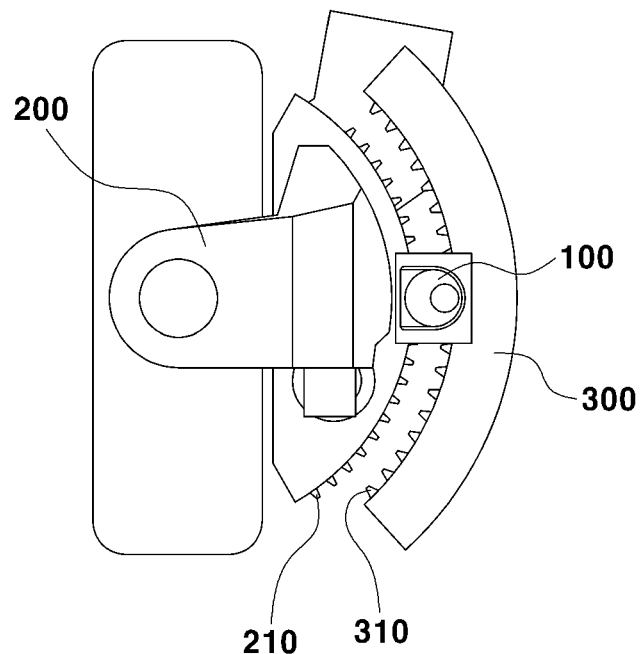
FIG. 7A is a top view illustrating a state in which the independent corner module has a steering angle of 0 degrees according to an embodiment of the present invention.
Figure 7B:
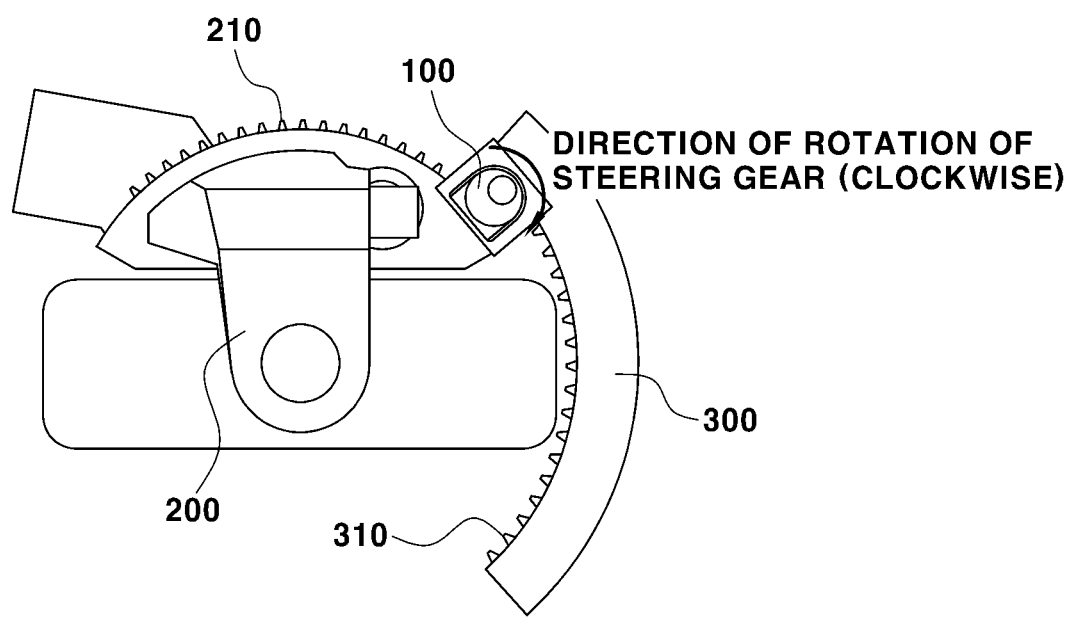
FIG. 7B is a top view illustrating a state in which the independent corner module has a steering angle of 90 degrees to the left according to an embodiment of the present invention.
Figure 7C:
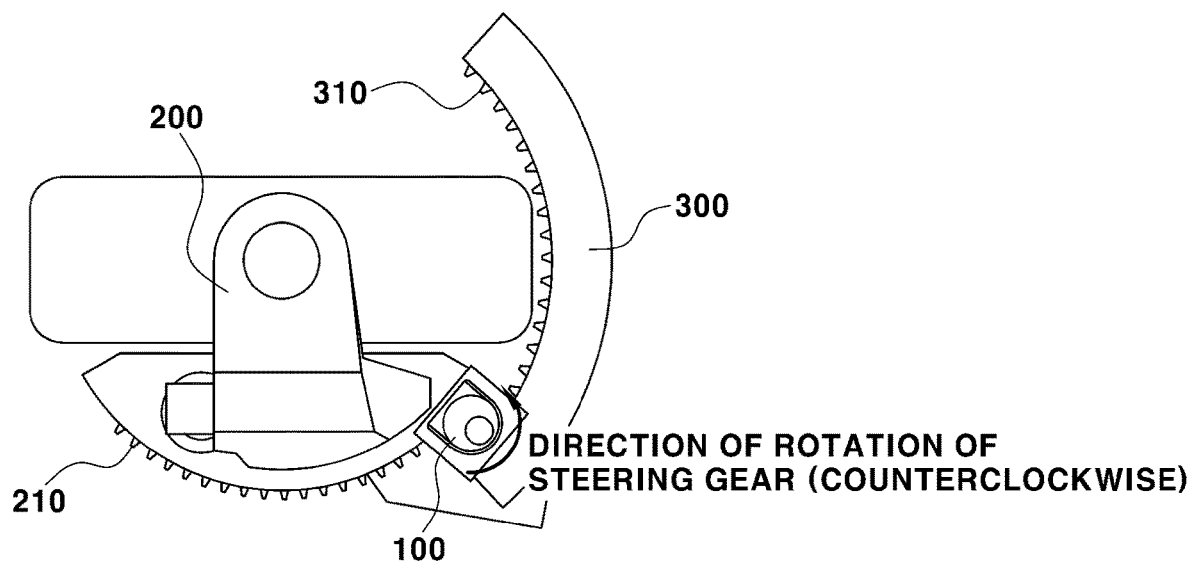
FIG. 7C is a top view illustrating a state in which the independent corner module has a steering angle of 90 degrees to the right according to an embodiment of the present invention.

FIG. 7A illustrates a state in which the independent corner module has a steering angle of 0 degrees according to an embodiment of the present invention. FIG. 7B illustrates a state in which the steering angle is 90 degrees to the left. FIG. 7C illustrates a state in which the steering angle is 90 degrees to the right.

As illustrated in the drawings, when the steering angle is 0 degrees, the wheel 10 is located corresponding to the longitudinal direction of the vehicle. Moreover, the steering drive unit 100 is located at the center of the arc-shaped end of the steering frame 200 and at the center of the arc-shaped end of the body guide rail 300. More preferably, the steering gear 130 is located both in the central region of the gear 210 and in the central region of the guide gear 310.

In FIG. 7A where the steering angle is input to the left, when a steering angle input command is input by a user operating a steering wheel or during autonomous driving, the motor 120 of the steering drive unit 100 applies a driving force to be rotated clockwise.

By the driving force of the motor 120, the steering gear 130 moves upward along the guide gear of the arc-shaped body guide rail 300, and at the same time, the gear 210 of the steering frame 200 moves upward along the steering gear 130 in section. More preferably, as the steering gear 130 is rotated, the steering drive unit 100 and the steering frame 200 are simultaneously rotated.

In an embodiment of the present invention, as illustrated in FIG. 7B, the wheel 10 has an angle of 90 degrees to the left when the steering gear 130 is fully rotated, the steering gear 130 is located at the upper end of the guide gear 310, and the lower end of the gear 210 of the steering frame 200 is moved to a position engaged with the steering gear 130.

On the contrary, when the steering angle is moved to the right, the motor 120 of the steering drive unit 100 is rotated counterclockwise, and the steering gear 130 is moved to a position close to the lower end of the body guide rail 300. Also, at the same time, the gear 210 of the steering frame 200 moves along the steering gear 130 so that the upper end of the gear 210 is moved to a position engaged with the steering gear 130.

As illustrated in FIG. 7C, when the steering angle is 90 degrees to the right, the steering gear 130 is located at the lower end of the guide gear 310, and the upper end of the gear 210 of the steering frame 200 is moved to engage with the steering gear 130.

In summary, in embodiments of the present invention, when a user's steering input or a steering input during autonomous driving is required, the steering drive unit 100 and the steering frame 200 are simultaneously rotated by the driving force of the motor 120 of the steering drive unit 100, so that the steering angle requested by the user is applied to the wheel 10.

Figure 8A:
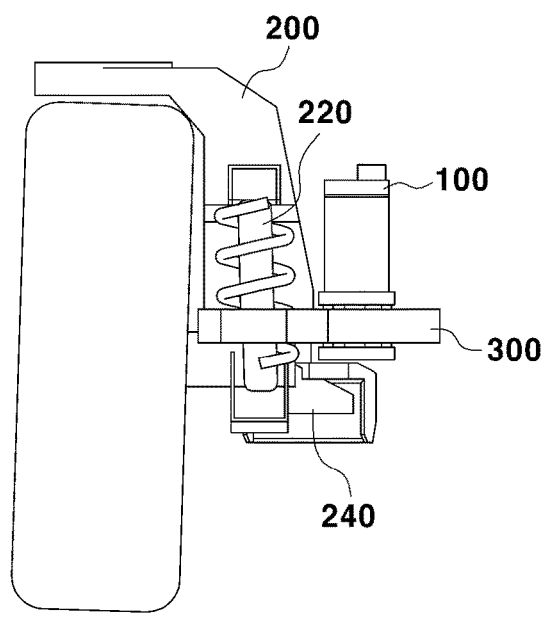
FIG. 8A is a schematic view illustrating a trailing arm when the independent corner module is in a bump state according to an embodiment of the present invention.

FIG. 8A is a front view of the independent corner module when the wheel 10 is in a bump state according to an embodiment of the present invention.

When the corner module is in a bump state, the wheel 10 is moved upward so as to be close to the height of the vehicle body, and the buffer 220 is converted to a contracted state.

Since the knuckle 500 fastened to the wheel 10 is moved upward, one end of the trailing arm 240 fastening the steering frame 200 and the knuckle 500 is moved upward simultaneously with the knuckle 500.

More preferably, the steering frame 200 is maintained at a constant height when wheel 10 is in the bump state, the buffer 220 is contracted in response to the shock applied to the wheel 10, and one end of the trailing arm 240 moves along with the movement of the knuckle 500.

Figure 8B:
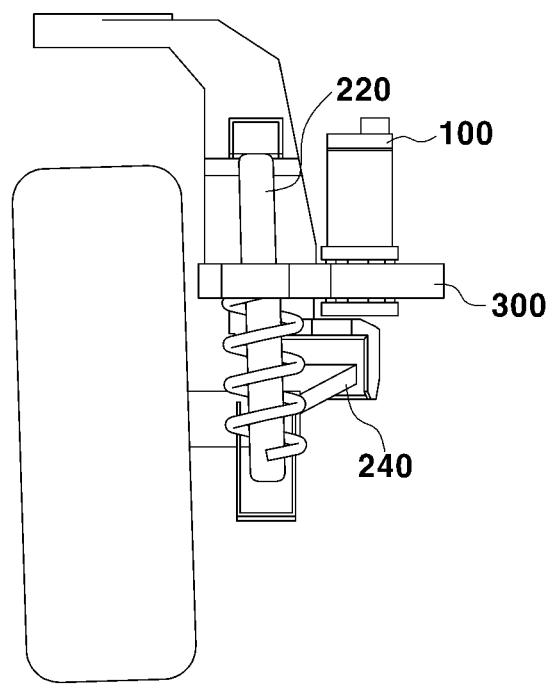
FIG. 8B is a schematic view illustrating the trailing arm when the independent corner module is in a rebound state according to an embodiment of the present invention.

On the contrary, FIG. 8B is a front view of the independent corner module when the wheel 10 is in a rebound state.

When the wheel 10 is in the rebound state, the wheel 10 is moved downward in the height direction of the vehicle, and the buffer 220 is converted to an extended state in the height direction. Moreover, one end of the trailing arm 240 fastened to the knuckle 500 is moved downward together with the wheel 10.

That is, the trailing arm 240 is moved together with the knuckle 500 when the wheel 10 is either in the bump state or in the rebound state, and absorbs the shock applied to the wheel 10 to transmit it to the vehicle body through the steering frame 200.

Figure 9:
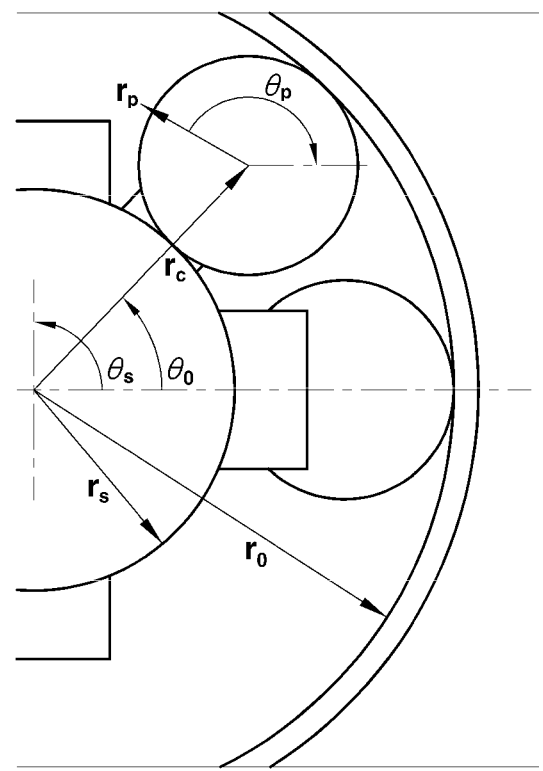
FIG. 9 illustrates a driving relationship for calculating the steering angle of the independent corner module according to an embodiment of the present invention.

FIG. 9 illustrates a formula for applying a steering angle by driving the steering drive unit 100 according to an embodiment of the present invention.

According to the illustrated formula, a steering angle is applied to the wheel 10 as follows:

$$\theta p/\theta o = (Rs+Ro)Rp$$

$$\theta sSRs = \theta pSRp = \theta oS(Rs+Ro) \qquad \text{Equation 1}$$

(where θp=an angle of rotation of the steering drive unit too, θo=an angle of rotation from the center of the wheel 10 to the center of the steering drive unit too, Rs=a distance from the center of the wheel 10 to one end of the steering frame 200 in contact with the steering drive unit too, Ro=a distance from the center of the wheel 10 to the body guide rail 300 in contact with the steering drive unit too, and Rp=a radius of rotation of the steering drive unit too).

The steering angle may be calculated through the angle of rotation of the steering drive unit too, the distance from the center of the wheel 10 to one end of the steering frame 200 located on the carrier link 110, and the distance from the center of the wheel 10 to one end of the body guide rail 300 located on the carrier link 110, and may be calculated through the angle of rotation of the steering frame 200 moved simultaneously with the rotation of the steering drive unit too.

As is apparent from the above description, embodiments of the present invention can obtain the following effects with reference to the exemplary embodiments thereof taken in conjunction with the configuration, combination, and use relationship described above.

Embodiments of the present invention have an effect of applying a wider steering angle to the wheel by independently rotating the steering drive unit and the steering frame.

In addition, embodiments of the present invention have an effect of providing structural stability capable of absorbing the vertical motion of the wheel, including the trailing arm located between the steering frame and the knuckle.

The above detailed description is illustrative of embodiments of the present invention. Although the present invention has been described with respect to preferred embodiments thereof, it will be apparent to those skilled in the art that the present invention can be used in various other combinations, modifications, and environments. That is, it will be apparent to those skilled in the art that various changes and modifications may be made without departing from the spirit and scope of the invention as defined in the following claims. Although the embodiments described above represent the best mode for implementing the technical idea of the present invention, it will be apparent to those skilled in the art that various changes are possible in specific applications and uses required for the present invention. Accordingly, the details described herein are not intended to limit the present invention to the disclosed embodiments. Moreover, the appended claims should be construed to encompass other embodiments as well.

What is claimed is:

1. An independent corner module comprising:
   a knuckle fastened to a wheel;
   a steering frame fastened to the knuckle, the steering frame having an upper end configured to be fixed to a vehicle body and to rotate together with the knuckle to apply a steering angle to the wheel;
   a steering drive unit fastened to the steering frame; and
   a body guide rail fastened to the steering drive unit and configured to be disposed on the vehicle body, wherein, in response to reception of a driving force of the steering drive unit, the steering drive unit is configured to be rotated along the body guide rail and the steering frame is configured to be rotated about the upper end of the steering frame simultaneously along with the rotation of the steering drive unit.

2. The independent corner module according to claim 1, wherein the steering drive unit comprises:
   a carrier link surrounding at least a portion of the steering frame and the body guide rail and configured to move along the body guide rail;
   a motor configured to apply a rotational force; and
   a steering gear extending from a rotary shaft of the motor and engaged to the body guide rail and the steering frame.

3. The independent corner module according to claim 2, wherein the carrier link comprises:
   an upper plate disposed on upper ends of the steering frame and the body guide rail;
   a lower plate configured to surround lower ends of the steering frame and the body guide rail at a position corresponding to the upper plate;
   an upper roller disposed between the steering frame and the upper plate and between the body guide rail and the upper plate; and
   a lower roller disposed between the steering frame and the lower plate and between the body guide rail and the lower plate.

4. The independent corner module according to claim 3, further comprising inclined parts formed at the upper ends and the lower ends of the steering frame and the body guide rail, wherein the upper and lower rollers face the inclined parts.

5. The independent corner module according to claim 1, wherein the steering frame comprises:
   a buffer disposed between the knuckle and the steering frame;
   a bearing disposed at the upper end of the steering frame and configured to be fastened to the vehicle body; and
   a gear disposed at a position facing the steering drive unit.

6. The independent corner module according to claim 5, wherein the buffer comprises:
   an upper end fastened to the steering frame; and
   a lower end fastened to the knuckle through the steering frame.

7. The independent corner module according to claim 5, wherein the body guide rail comprises a guide gear disposed at a position facing the steering driving unit.

8. The independent corner module according to claim 7, wherein the gear of the steering frame and the guide gear of the body guide rail have the same axis of rotation.

9. The independent corner module according to claim 1, further comprising a trailing arm disposed at a lower end of the steering frame, the trailing arm configured to be fastened to the knuckle and to move along with vertical movement of the knuckle.

10. A vehicle comprising:
    a vehicle body;
    a wheel coupled to the vehicle body;
    a knuckle fastened to the wheel;
    a steering frame fastened to the knuckle and having an upper end fixed to the vehicle body, the steering frame being configured to rotate together with the knuckle to apply a steering angle to the wheel;
    a steering drive unit fastened to the steering frame; and
    a body guide rail disposed on the vehicle body and fastened to the steering drive unit, wherein, in response to reception of a driving force of the steering drive unit, the steering drive unit is configured to be rotated along the body guide rail and the steering frame is configured to be rotated about the upper end of the steering frame simultaneously along with the rotation of the steering drive unit.

11. The vehicle according to claim 10, wherein the steering drive unit comprises:
    a carrier link surrounding at least a portion of the steering frame and the body guide rail and configured to move along the body guide rail;
    a motor configured to apply a rotational force; and
    a steering gear extending from a rotary shaft of the motor and engaged to the body guide rail and the steering frame.

12. The vehicle according to claim 11, wherein the carrier link comprises:
    an upper plate disposed on upper ends of the steering frame and the body guide rail;
    a lower plate surrounding lower ends of the steering frame and the body guide rail at a position corresponding to the upper plate;
    an upper roller disposed between the steering frame and the upper plate and between the body guide rail and the upper plate; and
    a lower roller disposed between the steering frame and the lower plate and between the body guide rail and the lower plate.

13. The vehicle according to claim 12, further comprising inclined parts formed at the upper ends and the lower ends of the steering frame and the body guide rail, wherein the upper and lower rollers face the inclined parts.

14. The vehicle according to claim 10, wherein the steering frame comprises:
    a buffer disposed between the knuckle and the steering frame;
    a bearing disposed at the upper end of the steering frame and fastened to the vehicle body; and
    a gear disposed at a position facing the steering drive unit.

15. The vehicle according to claim 14, wherein the buffer comprises:
    an upper end fastened to the steering frame; and
    a lower end fastened to the knuckle through the steering frame.

16. The vehicle according to claim 14, wherein the body guide rail comprises a guide gear disposed at a position facing the steering drive unit.

17. The vehicle according to claim 16, wherein the gear of the steering frame and the guide gear of the body guide rail have the same axis of rotation.

18. The vehicle according to claim 10, further comprising a trailing arm disposed at a lower end of the steering frame, the trailing arm configured to be fastened to the knuckle and to move along with vertical movement of the knuckle.

19. A method of operating an independent corner module of a vehicle, the independent corner module comprising a knuckle fastened to a wheel, a steering frame fastened to the knuckle and having an upper end fixed to a vehicle body, a steering drive unit fastened to the steering frame, and a body guide rail fastened to the steering drive unit and disposed on the vehicle body, the method comprising:

receiving a driving force of the steering drive unit;

in response to receiving the driving force, rotating the steering drive unit along the body guide rail, the steering frame being rotated together with the knuckle to apply a steering angle to the wheel; and simultaneously rotating the steering frame about the upper end of the steering frame along with the rotation of the steering drive unit.

20. The method according to claim 19, wherein:

the steering drive unit comprises:

a carrier link surrounding at least a portion of the steering frame and the body guide rail and moving along the body guide rail;

a motor applying a rotational force; and a steering gear extending from a rotary shaft of the motor and engaged to the body guide rail and the steering frame; and the carrier link comprises:

an upper plate disposed on upper ends of the steering frame and the body guide rail;

a lower plate surrounding lower ends of the steering frame and the body guide rail at a position corresponding to the upper plate;

an upper roller disposed between the steering frame and the upper plate and between the body guide rail and the upper plate; and a lower roller disposed between the steering frame and the lower plate and between the body guide rail and the lower plate.

\* \* \* \* \*